United States Patent
Biebach et al.

(10) Patent No.: US 9,343,993 B2
(45) Date of Patent: May 17, 2016

(54) DC/AC CONVERTER AND METHOD OF CONTROLLING A DC/AC CONVERTER

(75) Inventors: Jens Biebach, Tutzing (DE); Kay Peschke, Tutzing (DE)

(73) Assignee: L-3 COMMUNICATIONS MAGNET-MOTOR GMBH, Starnberg (DE)

( * ) Notice: Subject to any disclaimer, the term of this patent is extended or adjusted under 35 U.S.C. 154(b) by 208 days.

(21) Appl. No.: 14/124,473

(22) PCT Filed: Jun. 8, 2011

(86) PCT No.: PCT/EP2011/059516
§ 371 (c)(1),
(2), (4) Date: Apr. 16, 2014

(87) PCT Pub. No.: WO2012/167827
PCT Pub. Date: Dec. 13, 2012

(65) Prior Publication Data
US 2014/0268929 A1    Sep. 18, 2014

(51) Int. Cl.
| | | |
|---|---|---|
| *H02M 5/45* | (2006.01) | |
| *H02M 5/458* | (2006.01) | |
| *H02M 7/797* | (2006.01) | |

(52) U.S. Cl.
CPC .............. *H02M 5/458* (2013.01); *H02M 7/797* (2013.01)

(58) Field of Classification Search
CPC ..... H02M 5/45; H02M 5/458; H02M 5/4585; H02M 7/08; H02M 7/10; H02M 7/49; H02M 7/153; H02M 7/493; H02M 7/5359; H02M 7/5387; H02M 1/12; H02M 1/32
USPC ............. 363/36, 37, 40, 41, 44, 56.01, 56.02, 363/67, 69, 71
See application file for complete search history.

(56) References Cited

U.S. PATENT DOCUMENTS

| | | | | |
|---|---|---|---|---|
| 5,576,940 | A | * 11/1996 | Steigerwald | H02J 1/102 363/17 |
| 6,388,904 | B2 | * 5/2002 | Nomura | H02M 3/33569 363/132 |

FOREIGN PATENT DOCUMENTS

| | | |
|---|---|---|
| EP | 1 313 206 | 5/2003 |
| WO | 2010/086788 | 8/2010 |

OTHER PUBLICATIONS

International Search Report in PCT/EP2011/059516, pp. 1-3, Mar. 6, 2012.

* cited by examiner

*Primary Examiner* — Yemane Mehari
(74) *Attorney, Agent, or Firm* — Brinks Gilson & Lione

(57) ABSTRACT

A DC/AC converter includes a DC/DC conversion stage with galvanic isolation and a DC/AC conversion stage, wherein the DC/DC conversion stage comprises a pair of first side terminals providing or receiving a first DC voltage, a pair of second side terminals providing or receiving a second DC voltage and coupled to the DC/AC conversion stage, at least one first side converter circuit coupled between the pair of first side terminals, a series connection of a plurality of second side converter circuits coupled between the pair of second side terminals, and at least one transformer circuit coupling the plurality of second side converter circuits to the at least one first side converter circuit, wherein a connection point between two of the plurality of second side converter circuits is coupled to the DC/AC conversion stage and forms a neutral phase point thereof.

25 Claims, 6 Drawing Sheets

DC/AC CONVERTER AND METHOD OF CONTROLLING A DC/AC CONVERTER

RELATED APPLICATIONS

The present application claims the benefit under 35 U.S.C. §371 of International Patent Application No. PCT/EP/2011/059516, having an internal filing date of Jun. 8, 2011, the content of which is incorporated herein by reference in its entirety.

FIELD

The present invention is directed to a DC/AC converter and to a method of controlling a DC/AC converter.

BACKGROUND

DC/AC converters are in widespread use. A typical field of use for DC/AC converters, in particular high power DC/AC converters, are isolated networks, which are operated at AC voltages and whose power supply is a DC power source.

The high level structure of a common DC/AC converter 2 is shown in FIG. 1. The DC/AC converter 2 comprises a DC/DC conversion stage 4 and a DC/AC conversion stage 6. The DC/DC conversion stage 4 allows for a voltage conversion between a first DC voltage $V_{DC,Prim}$ and a second DC voltage $V_{DC,Sec}$. The DC/AC conversion stage 6 allows for a voltage conversion between the second DC voltage $V_{DC,Sec}$ and an AC voltage $V_{AC}$. While the DC/AC conversion stage 6 is a necessary portion of the DC/AC converter 2, the provision of the DC/DC conversion stage is dependent on the particular requirements for the DC/AC converter 2. Such a DC/DC conversion stage 4 may be provided, because it allows for a galvanic isolation between the DC end and the AC end of the DC/AC converter. It also allows for the provision of a DC voltage to the DC/AC conversion stage 6 that may be different from $V_{DC,Prim}$ supplied by a DC power source.

FIG. 2 shows a previous approach DC/AC conversion stage 6 having three AC phases. A DC voltage, in the present case denoted $V_{DC,Sec}$, is present at the DC side of the DC/AC conversion stage 6. At its AC side, the DC/AC conversion stage 6 has three AC terminals 80, 82 and 84, each of which is associated with one of the three phases of the AC voltage $V_{AC}$. Besides, the DC/AC conversion stage 6 has a neutral terminal 86, which provides the voltage reference, also denoted neutral phase, to the three AC terminals 80, 82 and 84. The neutral terminal is connected to ground. The neutral terminal 86 may be the center point of an AC star configuration having the three AC phases present at the AC terminals 80, 82 and 84. The DC/AC conversion stage 6 further comprises four half bridge converters 70, 72, 74 and 76, all of which are coupled to the DC side terminals of the DC/AC conversion stage 6. Three of these half bridge converters, namely the converters 70, 72 and 74, are associated with the three phases of the AC voltage, while the fourth converter 76 is associated with the neutral phase of the AC voltage system. These four half bridge converters are coupled to the three AC terminals 80, 82 and 84 and to the neutral terminal 86 via a filter 78, wherein the filter 78 is provided for conditioning the AC voltage system.

FIG. 3 shows a previous approach implementation of the DC/DC conversion stage 4 having a pair of first side terminals 10, across which the DC voltage $V_{DC,Prim}$ is coupled, and a pair of second side terminals 12, across which the DC voltage $V_{DC,Sec}$ is coupled. The pair of first side terminals are coupled to a first side converter circuit 20, which in turn is coupled to a transformer circuit 140, which in turn in coupled to a second side converter circuit 130, which in turn is coupled to the second side terminals 12. Each of the first side converter circuit 20 and the second side converter circuit 130 comprises an H bridge circuit, whose switches are controlled in such a way that a desired power transfer from the first side terminals to the second side terminals or from the second side terminals to the first side terminals takes place.

Previous approach DC/AC converters, as described above, have the disadvantage that they deviate from their desired electric behaviour in an unacceptable manner when changes in the operating conditions occur. Such changes may consist of varying electric loads applied to the DC side or to the AC side. Such changes can also consist of a change of power flow direction between the DC side and the AC side. These deviations from the desired behaviour can occur both in stationary states as well as relate to the dynamic response of the DC/AC converter to operating condition gradients.

Therefore, the problem underlying the present invention is to provide a DC/AC converter and a method of controlling a DC/AC converter that allow for a reduced sensitivity of the conversion system to changes in operating conditions, i.e. to allow an acceptable system behaviour over a wider range of operating conditions.

SUMMARY

This problem is solved by the DC/AC converter in accordance with the claims.

The claimed DC/AC converter comprises a DC/DC conversion stage with galvanic isolation and a DC/AC conversion stage, wherein the DC/DC conversion stage comprises a pair of first side terminals providing or receiving a first DC voltage, a pair of second side terminals providing or receiving a second DC voltage and coupled to the DC/AC conversion stage, at least one first side converter circuit coupled between the pair of first side terminals, a series connection of a plurality of second side converter circuits coupled between the pair of second side terminals, and at least one transformer circuit coupling the plurality of second side converter circuits to the at least one first side converter circuit, wherein a connection point between two of the plurality of second side converter circuits is coupled to the DC/AC conversion stage and forms a neutral phase point thereof.

By providing a neutral phase point for the DC/AC conversion stage within the DC/AC converter, in particular within the DC/DC conversion stage, the need for a separate voltage reference for the AC voltage of the DC/AC converter is eliminated. This is particularly advantageous, as providing the separate voltage reference required, in previous approaches as described above, the provision of a separate half bridge converter between the pair of second side terminals. The switching of said separate half bridge converter introduced undesired signal components, such that an imperfect reference point was present. As the undesired signal components varied with different operating conditions, for example with different loads at the AC terminals, the accuracy of the voltage reference point, and therewith the accuracy of the AC voltages, could not be ensured over a wide range of operating conditions. Accordingly, eliminating this separate half bridge converter allows for eliminating the signal artifacts introduced by the switching thereof. A highly reliable reference point is provided.

The proposed structure of the DC/AC converter has additional advantages. The elimination of the separate half bridge for the voltage reference allows for a reduction of circuit components, therefore reducing space and power requirements as well as cost of the DC/AC converter. Moreover, the provision of a plurality of second side converter circuits allows for partitioning the power to be transferred through the DC/DC conversion stage among several power transfer paths, such that each of the second side converter circuits can be dimensioned for a lower maximum power transfer capability than previous approach system having only one second side converter circuit. Accordingly, cheaper and/or smaller components may be used for the second side converter circuits.

Furthermore, the series connection of the second side converter circuits conveniently allows for providing a connection point between two of the second side converter circuits, which is used as the neutral phase point. The series connection provides an elegant way of creating the neutral phase point without further circuit components. The DC/DC conversion stage may in operation be controlled in such a way that the voltages between the connection point, which is the neutral phase point, and each of the pair of second side terminals are equal in magnitude. In this way, the voltages at the AC terminals of the DC/AC controller can swing around the voltage at the neutral phase point to equal positive and negative magnitudes. However, it is also possible that the voltage at the connection point is controlled to have a value different from the mid-point between the voltages at the pair of second side terminals, with an additional voltage source being coupled between the connection point and the neutral terminal of the DC/AC conversion stage for ensuring a neutral voltage at the neutral terminal. In either case, the voltage at the connection point may be controlled to have a preset value, such that it forms the reference point for the DC/AC conversion stage. It is also possible that the voltage at the connection point is controlled to result in unsymmetrical values of the voltages at the pair of second side terminals, while achieving the same voltage difference between the AC terminals and the neutral phase point with running the half bridge converters with less duty cycle.

The pair of first side terminals form a DC end of the DC/AC converter and may therefore also be referred to as the external connection terminals of the DC/DC conversion stage, whereas the pair of second side terminals are coupled to the DC/AC conversion stage and may therefore be referred to as the internal connection terminals of the DC/DC conversion stage. The language providing or receiving a DC voltage is used to indicate that the DC/AC converter is not necessarily restricted to one power transfer direction. The claimed structure of the DC/AC converter allows for power transfer from the first side terminals to the AC terminals as well as from the AC terminals to the first side terminals, wherein the power transfer direction may be switched. Accordingly, in the DC/DC conversion stage, each of the pair of first side terminals and the pair of second side terminals may be the source or the sink of a power transfer. In certain usage scenarios, however, it is possible that power transfer is carried out in one direction only.

According to a further embodiment of the invention, the series connection of the plurality of second side converter circuits consists of an even number of second side converter circuits and said connection point is a center point of the series connection of the plurality of second side converter circuits. In other words, there may be provided an even number M of second side converter circuits, with one set of M/2 second side converter circuits being coupled between one of the second side terminals and the center point and another set of M/2 second side converter circuits being coupled between the other of the second side terminals and the center point. In this way, when the voltages across the respective terminals of the second side converter circuits are controlled to be equal, the center point assumes a voltage value that is half-way between the voltages at the pair of second side terminals. Therefore, the center point is well-suited for forming a neutral phase point of the DC/AC conversion stage. In an alternative embodiment, different numbers of second side converter circuits may be coupled on the two side of said connection point. In this case, the voltages at their respective terminals may be controlled to have different magnitudes, such that the connection point still forms a center point of the DC voltage across the second side terminals in an electric sense.

According to a further embodiment, the DC/DC conversion stage has symmetric power transfer characteristics between the pair of first side terminals and the pair of second side terminals. In other words, the DC/DC conversion stage exhibits electrically identical behavior for the two power transfer directions, namely for the power transfer from the first side terminals to the second side terminals and from the second side terminals to the first side terminals. In this way, it is ensured that the DC/DC conversion stage's desired behavior is present in both power transfer directions and that the DC/AC converter has superior bi-directional power transfer properties.

According to a further embodiment, the number of transformer circuits is equal to the number of second side converter circuits, with each one of the plurality of second side converter circuits being associated with one of the at least one first side converter circuit via coupling through a respective transformer circuit. In particular, each of the second side converter circuits is associated with exactly one of the at least one first side converter circuits. In the case of power transfer from the second side terminals to the first side terminals, the power to be transferred is split up between the plurality of second side converter circuits. With the association of the second side converter circuits with the first side converter circuits, it is pre-determined which first side converter circuit will receive the power from a given second side converter circuit. Conversely, it is possible that the power to be transferred from a given first side converter circuit to the second side terminals is split up between a plurality of transformer circuits and therewith between a plurality of second side converter circuit. A set of a given first side converter circuit and the particular transformer circuit(s) and second side converter circuit(s) to which the power can be transferred from the given first side converter circuit can be referred to as a subsystem of the DC/DC conversion stage. The DC/DC conversion stage can have one or more subsystems. In case there is only one subsystem, said one subsystem has a plurality of second side converter circuits. In this way, the desired power transfer capacity of the DC/DC conversion stage may be divided among a plurality of subsystems, such that each subsystem may be designed for lower power transfer requirements and may therefore be cheaper and/or smaller.

It is also possible that a single transformer circuit couples one first side converter circuit to a plurality of second side converter circuits. The coupling may be done via a transformer having one set of windings on the side of the first side converter circuit and a plurality of sets of windings, corresponding in number to the plurality of second side converter circuits, on the side of the second side converter circuits.

According to a further embodiment, each of the at least one transformer circuit is configured to have a current source characteristic. The current source characteristics of the transformer circuits are an elegant means for facilitating the symmetric power transfer characteristics of the DC/DC conversion stage, because they allow the first side converter circuits and the second side converter circuits to have voltage source characteristics, such that the first and second side converter circuits can be designed in an identical manner giving rise to the symmetry of the DC/DC conversion stage. In particular, each transformer circuit may comprise a transformer and an inductance element coupled in series with the transformer. The inductance element is a circuit element separate from the transformer. However, in an alternative embodiment, a parasitic inductance of another circuit element present in the DC/DC conversion stage may be made use of for establishing the current source characteristic.

According to a further embodiment, the at least one first side converter circuit has a voltage source characteristic. If more than one first side converter circuit is present, it is possible that the several first side converter circuits as a group have a voltage source characteristic. It is also possible that each first side converter circuit has a voltage source characteristic. By providing a voltage source characteristic, the at least one first side converter circuit allows for good coupling properties to a DC source/sink coupled to the pair of first side terminals.

According to a further embodiment, a first side capacitance element is coupled between the pair of first side terminals. In this way, one circuit component, namely the first side capacitance element, may suffice to create the voltage source characteristics of the at least one first side converter circuit, irrespective of the actual number of first side converter circuits.

According to a further embodiment, each of the at least one first side converter circuits comprises an H bridge circuit. An H bridge circuit comprises four switches, in particular four transistors. Alternatively, it is possible that each of the first side converter circuits comprises a capacitive half bridge circuit. Such a capacitive half bridge circuit comprises two switches, for example two transistors, and one or two capacitors.

According to a further embodiment, each of the plurality of second side converter circuits has a voltage source characteristic. The arrangement of one or more first side converter circuits with voltage source characteristics, one or more transformer circuits with current source characteristics and the second side converter circuits with voltage source characteristics allows for providing power transfer symmetry in the DC/DC conversion stage of the DC/AC converter. Also, the voltage source characteristics of the second side converter circuits allow for good coupling properties to the DC/AC conversion stage. In a particular embodiment, each of the plurality of second side converter circuits comprises a second side capacitance element, with the second side capacitance elements being connected in series between the pair of second side terminals.

According to a further embodiment, each of the plurality of second side converter circuits comprises an H bridge circuit. An H bridge circuit may comprise four switches, in particular four transistors.

According to a further embodiment, the number of second side converter circuits is one of 2, 4, 6 and 8. With these values, a good trade-off between dividing up the power transfer among several second side converter circuits, which leads to lower power transfer requirements for the individual second side converter circuits as compared to previous approaches, and preventing the wiring and control expenses from becoming excessive can be achieved.

In a further embodiment, the at least one first side converter circuit is a plurality of first side converter circuits, with the plurality of first side converter circuits being connected in parallel between the first side terminals. In this way, the power transfer is also divided up among several first side converter circuits, such that the power transfer requirements per first side converter circuit can also be lowered on the first side of the DC/DC conversion stage as compared to previous approaches. This dividing up of power transfer, both on the first and second sides, may also lead to faster response times of the DC/DC conversion stage, such that the DC/AC converter is better at adapting to varying operating conditions.

According to a further embodiment, the number of first side converter circuits is equal to the number of second side converter circuits. In this way, a plurality of power transfer subsystems consisting of one first side converter circuit, one transformer circuit and one second side converter circuit are formed. Such subsystems consisting of three circuits only are particularly well-behaved and may be easily embedded into the effective controlling of the DC/AC converter over a wide range of operating conditions.

According to a further embodiment, the number of second side converter circuits is equal to the number of first side converter circuits multiplied by N, with N being a natural number of at least 2. In particular, N second side converter circuits, N transformer circuits and one first side converter circuits may form a respective power transfer subsystem. In this way, manageable power transfer subsystems consisting of a limited number of circuits are formed, which are still well-behaved, but require less hardware than the 1:1 ratio between first and second converter circuits as described above. The N transformer circuits of a respective power transfer subsystem may be connected in parallel. It is also possible to form such a power transfer subsystem from one first side converter circuit, one transformer circuit and N second side converter circuits. The one transformer circuit may then couple the one first side converter circuit to the N second side converter circuits via a transformer having one set of transformer windings on the first side and N sets of transformer windings on the second side.

According to a further embodiment, each of the at least one first side converter circuits is controlled by a respective first side control signal and each of the plurality of the second side converter circuits is controlled by a respective second side control signal. For this purpose, the DC/AC converter may comprise a control circuit coupled to the at least one first side converter circuit and the second side converter circuit and adapted to generate the first side control signals and second side control signals. In particular, the first side control signals and the second side control signals are signals for controlling respective H bridges.

According to a further embodiment, the first side control signals and second side control signals are controlled for being pulse signals having the same periods and duty cycles, with a phase relationship between the first side control signals and the second side control signals being controlled for controlling a power transfer between the pair of first side terminals and the pair of second side terminals. A pulse signal may be understood as a signal alternating between two states. In particular, the pulse signal may be a rectangular waveform signal. With the control signals generally controlling switches of the first and second side converter circuits, the amplitude of the control signals is generally irrelevant, as long as proper switching of the switches is ensured. In this way, only one kind of signal, in particular only one kind of waveform, is generated by the control circuit for controlling the DC/DC conversion stage. The control of the DC/DC conversion stage is then exclusively carried out via the phase relationship of different instances of that waveform. In this way, the control system expenses are kept low, and the control system, influencing only the phase relationship, can act fast when reacting to operating condition changes. According to a particular embodiment, the first side control signals and the second side control signals are pulse signals having a duty cycle of substantially 50%.

According to a further embodiment, each second side converter circuit is controlled with respect to its associated first side converter circuit, with a phase shift between the second side control signal of the respective second side converter circuit and the first side control signal of its associated first side converter circuit controlling a power transfer. In this way, a separate control of each power transfer subsystem is achieved, such that different loading of the various power transfer subsystems can be accounted for by the control of the DC/DC conversion stage. It is possible to control the phasing of each second side converter circuit depending on the associated first side converter circuit, such that a plurality of second side converter circuits that are all associated with the same first side converter circuit can still be controlled independently from each other.

According to a further embodiment, a ratio of a second side voltage of each of the second side converter circuits and a voltage across the pair of first side terminals is controlled to be a transformer ratio of the respective one of the at least one transformer circuit coupling the respective second side converter circuit to the at least one first side converter circuit. In other words, the DC/AC converter, in particular its control circuit, is adapted to control each second side converter circuit such that a voltage across its second side terminals is the voltage across the first side terminals corrected by the transformer ratio of the transformer circuit coupling the respective second side converter circuit to the at least one first side converter circuit. The term corrected may be substituted in the preceding sentence with the term divided, if the transformer ratio of the respective transformer is defined as the number of windings on the side of the first side converter circuit divided by the number of windings on the side of the second side converter circuit. By controlling the ratio between the voltage across the first side terminals and across the second side terminals of the second side converter circuits in this way, the reactive power losses of the DC/DC conversion stage can be kept to a minimum, such that the DC/DC conversion stage can be operated with very high efficiency.

According to a further embodiment, each of the plurality of second side converter circuits is controlled separately. In this way, above ratio can be maintained for each of the second side converter circuits, even in the case of unequal loading of the second side converter circuits from the DC/AC conversion stage and from the AC load connected thereto.

It is pointed out that the circuit structure of the DC/AC converter, as described above and as claimed, allows for the advantages described when being used with a wide variety of methods of controlling the DC/AC converter, in particular with various methods of controlling the DC/AC conversion stage thereof. However, with the method of controlling the DC/AC conversion stage, as described herein, additional advantages and a particularly good system behavior may be achieved.

Above mentioned problem is further solved by the method of controlling the DC/AC conversion stage of the DC/AC converter in accordance with the claims.

The claimed method of controlling the DC/AC conversion stage of the DC/AC converter comprises the steps of (a) providing a desired AC side reference value; (b) setting a reference correction value; (c) calculating an AC side reference signal as a function of the desired AC side reference value and the reference correction value; (d) obtaining an actual AC side signal; and (e) calculating a converter control signal as a function of the AC side reference signal and the actual AC side signal; wherein the setting of the reference correction value is based on a relation of the desired AC side reference value and the actual AC side signal.

The actual AC side signal is a signal that represents the electric behavior at at least one of the AC terminals of the DC/AC converter. It represents the actual electric behavior at the AC side of the DC/AC converter. It can be a signal indicating the voltage behavior at the AC terminal or AC terminals under consideration. The AC side reference signal represents a signal that serves as a reference to the actual AC side signal. It represents a behavior of the AC terminal(s) that the control wants to achieve for the actual behavior at the AC terminal(s). The converter control signal is therefore calculated as a function of these two signals. The calculating of the converter control signal is referred to as a lower control level of the DC/AC converter. With the calculating of the converter control signal involving the actual AC side behavior of the DC/AC converter, a feedback control loop is established. The converter control signal is a signal controlling the actual converter circuitry, in particular the half bridge converter(s) of the DC/AC converter.

The desired AC side reference value is a parameter which is a characteristic value of the desired electric AC side behavior. With the desired AC voltage being an alternating voltage and the desired current potentially having alternating components, the desired AC reference value may be an amplitude of the desired voltage or current waveform present at the AC terminals of the DC/AC converter.

As the reference correction value is set based on a relation of the desired AC side reference value and the actual AC side signal, the AC side reference signal is a function of the desired AC side reference value and the actual AC side signal. In this way, a second feedback control loop is established, with the AC side reference signal being at the output thereof and at the input of the lower control level, as described above. Therefore, the setting of the reference correction value is referred to as a higher control level of the DC/AC converter. It forms a controller for the controller.

With the reference correction value being based on the relation of the desired AC side reference value and the actual AC side signal, there may be instances during the operation of the control method where the reference correction value is set to not have an impact, such that the AC side reference signal corresponds to a signal representing the desired behavior of the AC terminal(s) of the DC/AC converter. In other instances, however, the reference correction value may be set to such a value that the AC side reference signal, while deviating from the desired behavior of the AC terminal(s) of the DC/AC converter, is a more easily reachable target for the lower control level and/or makes it easier for the lower level control to reach a behavior close to the desired behavior at the AC terminal(s). In other words, the setting of the reference correction value allows for trading off control accuracy in terms of reaching exactly the desired AC side behavior for making it possible or easier to reach an AC side behavior that is acceptably close to the desired AC side behavior.

In this way, the higher level control helps the lower level control to reach its control target. The lower level control can make the actual AC side signal converge to the AC side reference signal also in cases where it would be impossible without the provision of the reference correction value. Therefore, the DC/AC converter is allowed to work reliably over a wider range of operating conditions, as the control of the DC/AC converter is allowed to converge in cases where it failed to converge in previous approaches.

The control method works particularly effectively with the inventive circuit structure of the DC/DC conversion stage, as described above, because it can work with the highly reliable reference point provided at the connection between two of the second side converter circuits. No signal disturbances are introduced through the switching of the reference point half bridge converter present in previous approaches, such that the control handles a DC/AC conversion stage that is more predictable and therefore more reliably controllable.

According to a further embodiment, the method is executed iteratively, with steps (d) and (e) being executed several times per every execution of the method. As with any control method, an iterative or continuous execution of the calculations is carried out, such that the control target, namely the converging of the actual AC side signal to the AC side reference signal, can be achieved. Per every execution of steps (b) and (c), however, steps (d) and (e) are executed several times. Accordingly, the lower level control is given time to reach the control target, before the same is adjusted by the higher level control. In this way, it is ensured that the controller for the controller only intervenes when the lower level control has difficulties reaching the control target. If there are no such difficulties, no control accuracy is given up. For example, step (e) may be a continuous calculation or may take place many times per period of the actual AC side signal, whereas step (b) may be carried out once or twice per period of the actual AC side signal.

According to a further embodiment, the setting of the reference correction value is done in such a way that a deviation of the actual AC side signal from the desired AC side reference value is decreased. In other words, influence is taken on a control error present between the AC side reference signal and the actual AC side signal in such a way via the higher level control of the AC side reference signal that the converter control signal leads to a decrease in the deviation of the actual AC side signal from the desired behavior. In yet other words, steps (b) and (c) result in the AC side reference signal being adjusted in a way to minimize a deviation between a characteristic value of the actual AC side signal, such as an amplitude value of the actual AC side signal, and the desired AC side reference value.

In order to achieve above described decrease of the deviation of the actual AC side signal from the desired AC side reference value, the steps (b) and (c) may result in an increase of a deviation between the AC side reference signal and the actual AC side signal. In other words, the AC side reference signal is controlled to have a greater deviation from the actual AC signal as compared a control method without the reference correction value. In this way, the higher level control sets a target for the lower level control that is further removed than the actually desired behavior. As a consequence, the lower level control may take more drastic measures to work towards its control target. In this way, an operating point close to the desired AC side behavior may be reached faster. Therefore, the control target is worked towards in two ways. While step (e) controls the DC/AC converter circuitry in such a way that the actual AC side signals approximates the AC side reference signal, steps (b) and (c) aim at manipulating the AC side reference signal in such a way that the actual AC side signal is brought close to the AC side reference signal that would be present without the effect of the reference correction value in a more effective manner.

According to a further embodiment, the relation of the desired AC side reference value and the actual AC side signal is a relation of the desired AC side reference value and an amplitude of the actual AC side signal. In other words, the setting of the reference correction value is based on a comparison of a characteristic parameter of the actual AC side signal, namely the amplitudes thereof, and the desired AC side reference value. The desired AC side reference value may therefore be a desired AC side amplitude reference value. Accordingly, the actual AC side signal may not have to be analysed completely in order to be related to the desired AC side reference value. In this way, the hardware and/or computing requirements for the higher control level are kept low.

According to a further embodiment, the relation of the desired AC side reference value and the actual AC side signal is a difference between the desired AC side reference value and an amplitude of the actual AC side signal, with the reference correction value being adjusted if an absolute value of said difference between the desired AC side reference value and the amplitude of the actual AC side signal is above a preset correction threshold. The difference between the amplitude of the actual AC side signal and the desired AC side reference value may be compared with the preset correction threshold. In this way, it is ensured that minor deviations of the actual AC side signal from the desired AC side reference value do not lead to an intervention from the higher level control via the reference correction value. In particular, it is prevented that such an intervention would lead to another deviation of the actual AC side signal in the other direction, such that the higher level control would then adjust the reference correction value in the other direction as well. In such a way, a continuous toggling between two reference correction values could arise, which is prevented via the preset correction threshold.

According to a further embodiment, the reference correction value is adjusted by applying a preset increment value. In this way, a step size for adjusting the reference correction value is set. It allows therefore for adjusting the AC side reference signal in preset step sizes. Accordingly, in an iterative process, it is tested how well the deviation between the actual AC side signal and the desired AC side reference value can be mitigated via the converter control signal, i.e. via the lower level control. Iteratively, it is checked if the deviation can be eliminated with the new reference correction value. If not, the reference correction value is again adjusted by the preset increment value. Applying a preset increment value is understood to be adding or subtracting the preset increment value to the momentary reference correction value depending on a sign of the difference between the desired AC side reference value and the amplitude of the actual AC side signal. The preset increment value may be the same or a different value than the preset correction threshold described above.

According to a further embodiment, the desired AC side reference value is a desired voltage amplitude value and the reference correction value is a voltage amplitude correction value, with the step of calculating the AC side reference signal comprising calculating a sum of the desired voltage amplitude value and the voltage amplitude correction value and multiplying said sum with a desired waveform signal having a desired AC frequency. The desired waveform signal may in particular be a sinusoidal waveform signal.

While the present control method is particularly suitable for the power transfer from the DC side to the AC side of the DC/AC converter, a power transfer from the AC side to the DC side can also be effected. As discussed above, the DC/AC converter may be a bi-directional DC/AC converter.

According to a further embodiment, step (c) comprises generating a distortion smoothing signal, with the AC side reference signal being calculated as a function of the desired AC side reference value, the reference correction value and the distortion smoothing signal. The switching of the converters, in particular of the half bridge converters, of the DC/AC converter commonly leads to artifacts in the AC output of the DC/AC converter, such that the AC voltage/current at the AC terminal(s) does contain undesired signal components. These artifacts can be preemptively counter-measured by providing the distortion smoothing signal. The artifacts are particularly severe for low duty cycles of the converter control signals, i.e. for short conduction times in the converter switches, which might occur at low voltage values for the actual AC side signal. Accordingly, the distortion smoothing signal may be particularly designed to provide an improved behavior in these scenarios, extending the well-behaved range of operating conditions of the DC/AC converter.

According to a further embodiment, the distortion smoothing signal comprises at least one signal component having a frequency that is a multiple of a desired AC side frequency. In this way, the distortion smoothing signal eliminates harmonics introduced by the switching actions in the converter circuits. The distortion smoothing signal may be comprised of one or of a plurality of signal components.

According to a further embodiment, the converter control signal controls a switching pulse width for a converter half bridge. The converter control signal may therefore be seen as a PWM signal (pulse width modulation signal).

According to a further embodiment, the DC/AC converter comprises a plurality of AC side terminals, with each of the plurality of AC side terminals having a respective actual AC side signal, with each of the plurality of actual AC side signals being controlled separately. Accordingly, the control method as described above is carried out individually per phase of the AC voltage system of the DC/AC converter. In other words, the actual AC side signal may be comprised of a plurality of phases, with each phase being controlled separately in accordance with the method described herein. The AC voltage system of the DC/AC converter may have three phases, but it also may have another number of phases.

According to a further embodiment, the converter control signal is obtained from a feed forward control signal, which is based on the AC side reference signal, and a feedback control signal, which is calculated by applying a control algorithm to a difference between the AC side reference signal and the actual AC side signal. In this way, a closed control loop is established that is accompanied by a feed forward control path, alleviating some of the control burden of the feedback control path. The control algorithm of the feedback control path may comprise a proportional gain element and a generalized integration element.

According to a further embodiment, the feed forward control signal may be calculated as a function of the AC side reference signal and an actual DC side signal. In particular, the feed forward control signal may be calculated as a function of the AC side reference signal and an actual DC side voltage value. The AC side reference signal may be scaled by the actual DC side voltage value. It may be divided by the actual DC side voltage value and multiplied by a feed forward multiplication factor. In this way, it is ensured that the converter control signal is adjusted to the DC voltage present at the converter half bridges, such that the closing times are adjusted to the current operating conditions. The actual DC side voltage value refers to the voltage value present at the DC side of the converter circuits of the DC/AC converter. If the DC/AC converter comprises a DC/DC conversion stage and a DC/AC conversion stage, the actual DC side voltage value is the DC side voltage of the DC/AC conversion stage. It is the DC voltage at that side of the DC/DC conversion stage that is coupled to the DC/AC conversion stage.

According to a further embodiment, the DC/DC conversion stage has a desired operating point and the converter control signal is dependent on a deviation of the DC/DC conversion stage from the desired operating point. In this way, the DC/AC conversion stage may be controlled in such a way that its control accuracy is neglected in situations where the DC/DC conversion stage cannot support its desired operating point in favor of the DC/DC conversion stage recuperating its desired operating point. In this way, the DC/AC converter as a whole may be able to react faster to operating condition changes and the control problems arising therefrom. In particular, the minimum necessary voltage levels at the DC/DC conversion stage may be maintained, such that the DC/AC converter as a whole is not in risk of experiencing an emergency power-down condition. Therefore, this feature again helps keeping the DC/AC converter working over a wide range of operating conditions, only giving up temporary control accuracy.

According to a further embodiment, the DC/DC conversion stage has a desired operating point, the method further comprising the steps of calculating a reference signal adjustment value as a function of a deviation of the DC/DC conversion stage from the desired operating point; and, after step (c) and before step (e), adjusting the AC side reference signal on the basis of the reference signal adjustment value. This is a way how the momentary operating conditions of the DC/DC conversion stage can be accounted for. The control accuracy of the DC/AC conversion stage, namely the amplitude accuracy of the actual AC behavior, can temporarily be traded off against a recuperation of the desired operating point by the DC/DC conversion stage.

According to a further embodiment, the reference signal adjustment value is set to 1 when the DC/DC conversion stage does not deviate more than a preset deviation threshold from the desired operating point. Accordingly, this control mechanism only kicks in when the DC/DC conversion stage deviates a significant amount from its desired operating point.

According to a further embodiment, the DC/DC conversion stage has a desired operating point, the method further comprising the steps of providing a desired AC frequency value; calculating an AC frequency adjustment value as a function of a deviation of the DC/DC conversion stage from the desired operating point; and controlling an AC frequency of the DC/AC converter on the basis of the desired AC frequency value and the AC frequency adjustment value. This is a further way how the momentary operating conditions of the DC/DC conversion stage can be accounted for. Again, the control accuracy of the DC/AC conversion stage, namely the frequency accuracy of the actual AC behavior, can temporarily be traded off against a recuperation of the desired operating point by the DC/DC conversion stage. The adjustment of the frequency can also help to lower the power supplied from the DC/AC converter to the AC network connected thereto, and can thus help the DC/DC conversion stage to be less loaded temporarily and recuperate.

According to a further embodiment, the step of controlling the AC frequency of the DC/AC converter comprises the step of multiplying the desired AC frequency value with the AC frequency adjustment value, with the AC frequency adjustment value being 1 when the DC/DC conversion stage does not deviate more than a preset deviation threshold from the desired operating point.

With the provision of the reference signal adjustment value and the AC frequency adjustment value, it can be influenced which one of the frequency of the AC voltage system or the amplitude of the AC voltage system is to be adjusted when the DC/DC conversion stage does not operate as desired. In AC voltage systems where the DC/AC converter is the only power source for the AC voltage system, also referred to as passive networks, preference may be given to a change in amplitude. In AC voltage systems where the DC/AC converter is one of a plurality of power sources for the AC voltage system, also referred to as active networks, preference may be given to a change in frequency.

According to a further embodiment, the method comprises the step of calculating a DC/DC conversion stage performance metric indicative of the deviation of the DC/DC conversion stage from the desired operating point, which comprises the steps of dividing a voltage at a second side of the DC/DC conversion stage by a voltage at a first side of the DC/DC conversion stage and multiplying the result with a desired DC/DC conversion ratio. In this way, the DC/DC conversion stage performance metric represents a ratio of the actual DC voltage at the DC side of the DC/AC conversion stage and the desired DC voltage at the DC side of the DC/AC conversion stage.

BRIEF DESCRIPTION OF THE DRAWINGS

The invention is described in more detail below with regard to the exemplary embodiments shown in the accompanying figures, in which.

DETAILED DESCRIPTION OF THE PREFERRED EMBODIMENTS

Figure 1:
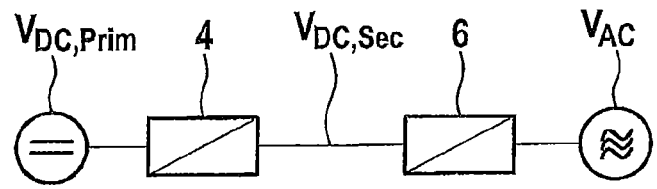
FIG. 1 shows a block diagram of a DC/AC converter.
Figure 2:
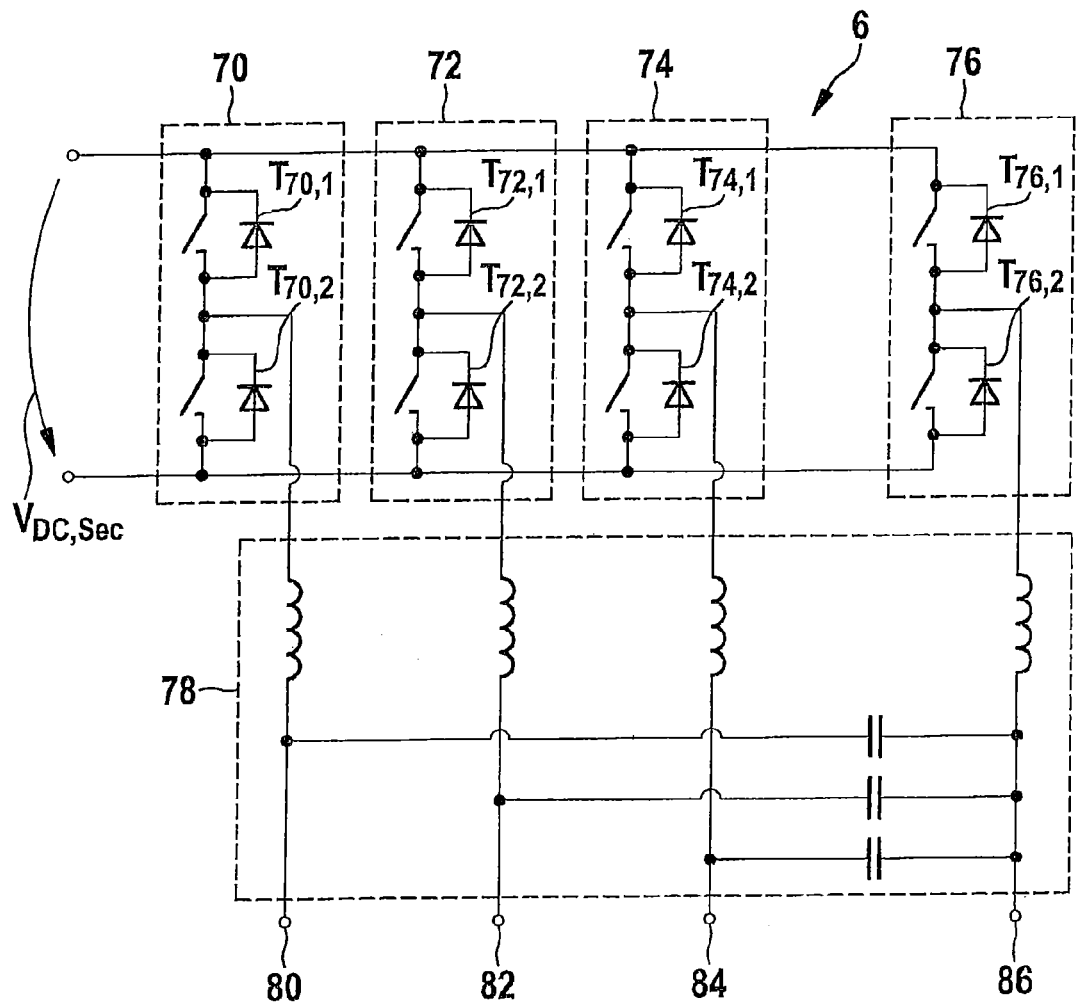
FIG. 2 shows a previous approach implementation of a DC/AC conversion stage of a DC/AC converter.
Figure 3:
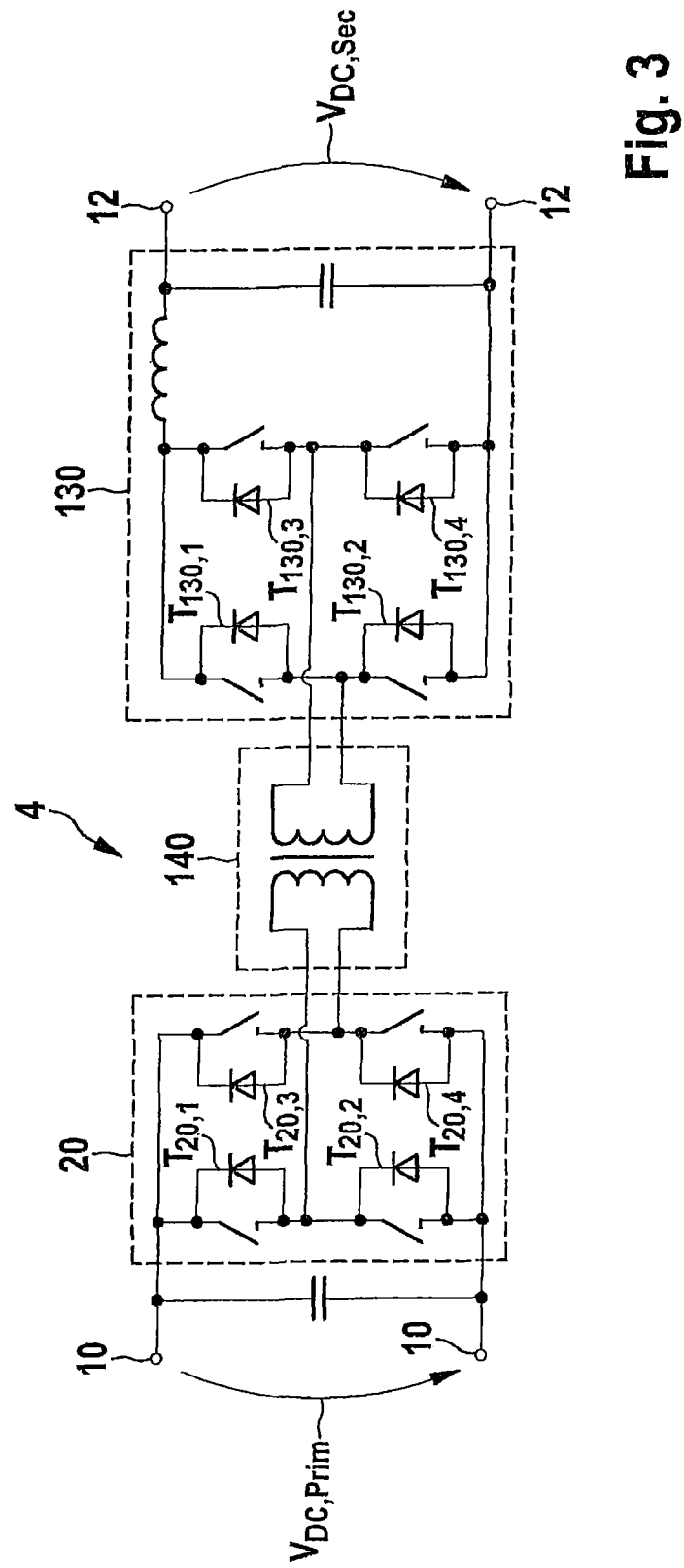
FIG. 3 shows a previous approach implementation of a DC/DC conversion stage of DC/AC converter.
Figure 4:
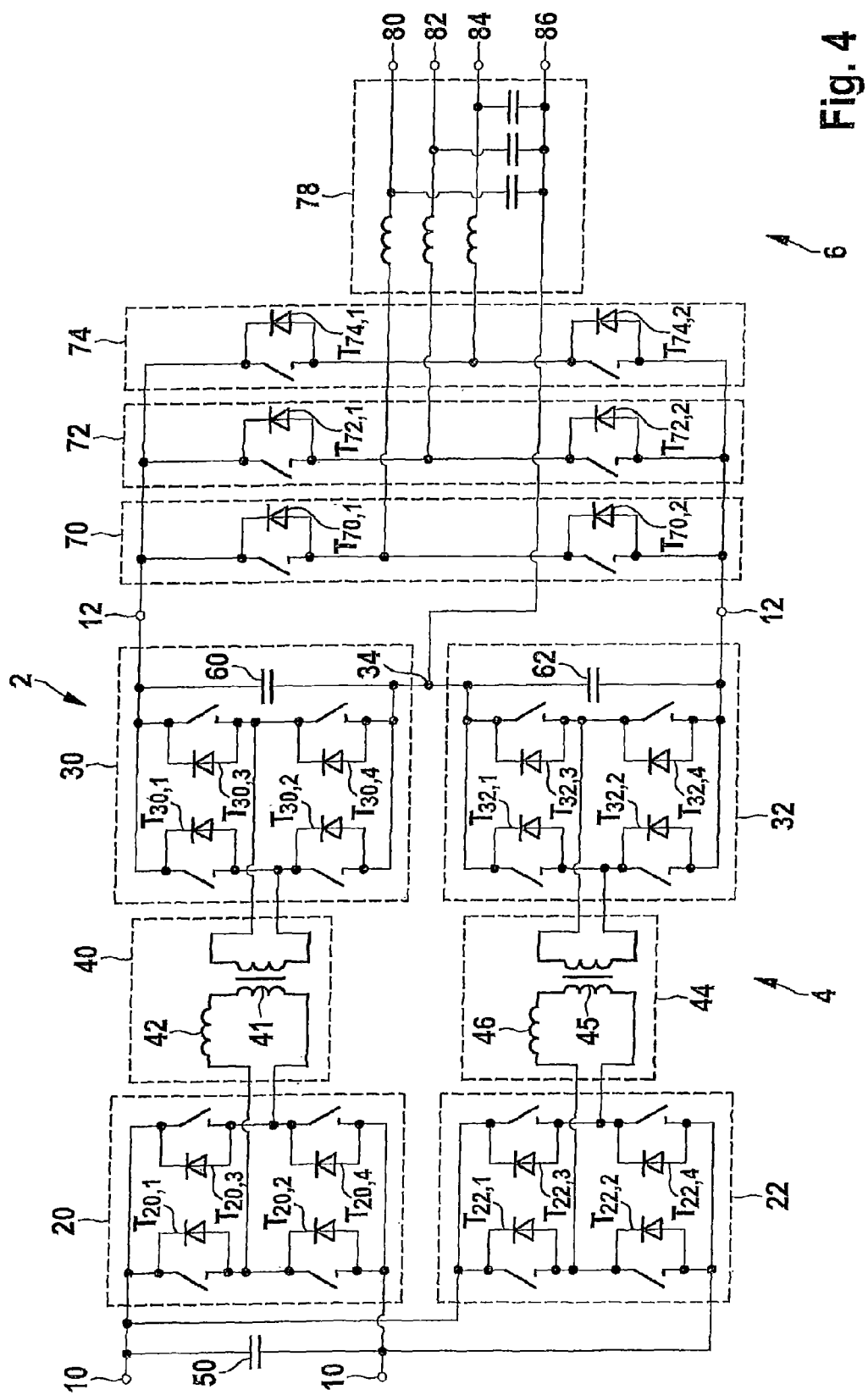
FIG. 4 shows a circuit diagram of a DC/AC converter according to an exemplary embodiment of the invention.

FIG. 4 shows a circuit diagram of a DC/AC converter 2 according to an exemplary embodiment of the invention. The DC/AC converter 2 comprises a DC/DC conversion stage 4 and a DC/AC conversion stage 6. Elements identical or similar to the corresponding elements of FIGS. 1 to 3 are denoted with the same reference numerals for the sake of an easier understanding.

The DC/DC conversion stage 4 comprises a pair of first side terminals 10 and a pair of second side terminals 12. As the pair of first side terminals 10 are the DC end of the DC/AC converter 2, they are also referred to as DC side terminals of the DC/DC conversion stage 4. Moreover, as the second side terminals 12 form the connection point to the DC/AC conversion stage 6, they are also referred to as AC side terminals of the DC/DC conversion stage 4.

Two first side converter circuits 20, 22 and a first side capacitor 50 are respectively coupled between the pair of first side terminals 10. In other words, the first side converter circuits 20, 22 and the first side capacitor 50 are coupled in parallel between the first side terminals 10. Each of the first side converter circuits 20, 22 comprises four transistors coupled in an H bridge arrangement. The transistors of the first side converter circuit 20 are denoted $T_{20.1}$ to $T_{20.4}$. The transistors of the first side converter circuit 22 are denoted $T_{22.1}$ to $T_{22.4}$. In the circuit diagram of FIG. 4, the transistors are represented by a switch and an antiparallel diode, respectively, indicating that these transistors are MOSFETs in the exemplary embodiment of FIG. 4. The transistors may also be insulated gate bipolar transistors coupled with antiparallel diodes or other suitable power electronic switches having suitable properties.

Due to the provision of the first side capacitor 50, the first side converter circuits 20, 22 have voltage source characteristics. It could also be stated that the group of the first side converter circuits 20, 22 has a voltage source characteristic. It is pointed out that it would be electrically equivalent to provide a capacitor in each of the first side converter circuits 20, 22 making it clear that both of the first side converter circuits 20, 22 have voltage source characteristics.

Two second side converter circuits 30, 32 are coupled in series between the pair of second side terminals 12. Each of the second side converter circuits 30, 32 comprises four transistors coupled in an H bridge arrangement as well as a second side capacitor. The transistors of the second side converter circuit 30 are denoted $T_{30.1}$ to $T_{30.4}$, while the second side capacitor of the second side converter circuit 30 is denoted with reference numeral 60. The transistors of the second side converter circuit 32 are denoted with reference numerals $T_{32.1}$ to $T_{32.4}$, while the second side capacitor of the second side converter circuit 32 is denoted with reference numeral 62. The transistors of the second side converter circuits are depicted in the same way as the transistors of the first side converter circuits, indicating that they are MOSFETs in the exemplary embodiment of FIG. 4. The transistors may also be insulated gate bipolar transistors coupled with antiparallel diodes or other suitable power electronic switches having suitable properties.

The second side converter circuits 30, 32 are coupled at a connection point 34, such that they are arranged in series between the pair of second side terminals 12. Due to the provision of the second side capacitors 60, 62 in parallel with the respective H bridge circuits, the second side converter circuits 30, 32 have voltage source characteristics. Also, the group of second side converter circuits 30, 32 has a voltage source characteristic.

The DC/DC conversion stage 4 further comprises two transformer circuits 40, 44. The transformer circuit 40 comprises a transformer 41 and an inductance element 42 coupled in series with the transformer 41. The transformer circuit 44 comprises a transformer 45 and an inductance element 46 coupled in series with the transformer 45. The provision of the inductance elements 42, 46 ensures that the transformer circuits 40, 44 have current source characteristics. In the exemplary embodiment of FIG. 4, the inductance elements 42, 46 are separate, discrete circuit elements. However, it is also possible that these inductance elements are parasitic inductances of other circuit elements, for example of the transformers 41 and 45. However, the inductance elements, parasitic or not, are chosen to have enough inductance to provide for the current source characteristic of transformer circuits 40, 44.

The transformer circuit 40 couples the H bridge of the first side converter circuit 20 to the H bridge of the second side converter circuit 30. The transformer circuit 44 couples the H bridge of the first side converter circuit 22 to the H bridge of the second side converter circuit 32.

The DC/AC conversion stage 6 of the DC/AC converter 2 is coupled between the second side terminals 12 of the DC/DC conversion stage 4 and three AC terminals 80, 82 and 84. The DC/AC conversion stage 6 comprises the three AC terminals, because the exemplary AC voltage system coupled to the exemplary DC/AC converter 2 is a three phase AC voltage system. Of course, depending on the number of phases required for whatever system is coupled to the AC terminals of the DC/AC converter 2, a different number of AC terminals may be present. The DC/AC conversion stage 6 further comprises a neutral terminal 86, which serves as a reference terminal to the AC terminals 80, 82 and 84, in particular as a center point of a three phase star AC configuration.

The DC/AC conversion stage 6 of the exemplary DC/AC converter 2 of FIG. 4 further comprises three half bridge converters 70, 72 and 74. These are associated with the AC terminals 80, 82 and 84, respectively, and selectively allow for current flow between the second side terminals 12 and the AC terminals. The half bridge converters 70, 72 and 74 are respectively coupled between the second side terminals 12. Each half bridge converter comprises a transistor pair coupled in series, with the center point between the two transistors being coupled to the respective AC terminal Each of the transistors is again depicted as a switch and a diode connected in parallel, indicating that they are MOSFETs in the embodiment of FIG. 4. The transistors may also be insulated gate bipolar transistors coupled with antiparallel diodes or other suitable power electronic switches having suitable properties.

In the particular embodiment of FIG. 4, the half bridge converters 70, 72 and 74 are coupled to the AC terminals 80, 82 and 84 through a filter 78. The filter 78 comprises inductive elements as well as capacitive elements conditioning the AC voltages at terminals 80, 82, 84 in accordance with the requirements of a particular application. The filter 78 provides for an LC filtering element between each of the AC terminals and the neutral terminal 86 as a reference. However, it is pointed out that the filter 78 is an optional feature and may be dispensed with.

The neutral terminal 86 forms a neutral phase point of the DC/AC conversion stage 6, forming a reference point for the AC terminals 80, 82 and 84. It is 35 coupled to and interacts with the AC terminals 80, 82 and 84 via the filter 78.

The neutral terminal 86 is further coupled to the connection point 34 of the DC/DC conversion stage 4. In the embodiment of FIG. 4, the neutral terminal is directly connected to the connection point 34, without any other circuit elements arranged therebetween.

The operation of the DC/AC converter 2 is described as follows.

As the DC/DC conversion stage 4 is electrically symmetric between the pair of first side terminals 10 and the pair of second side terminals 12, identical operating behaviour can be achieved and identical control algorithms can be used for a power transfer from the first side terminals to the second side terminals and from the second side terminals to the first side terminals. The symmetry is achieved through the arrangement of converter circuits with voltage source characteristics at the first side terminals as well as the second side terminals, with transformer circuits with current source characteristic being arranged therebetween.

The DC/DC conversion stage 4 is controlled in such a way that the voltage across each of the second side capacitors 60, 62 equals the voltage across the first side capacitor 50 divided by the transformer ratio of the respective transformer 41, 45. In other words, the voltage across the second side capacitance element 60 is controlled to be equal to the voltage across the first side capacitor 50, which is $V_{DC,Prim}$, divided by the transformer ratio $N_{T,41}$ of transformer 41, which is defined as the ratio of first side transformer windings $N_{Prim,41}$ and second side transformer windings $N_{Sec,41}$ of the transformer 41, i.e. as $N_{Prim,41}/N_{Sec,41}$. Analogously, the voltage across the second side capacitor 62 is controlled to be equal to the voltage across the first side capacitor 50 divided by the transformer ratio $N_{T,45}$ of transformer 45, which is defined as the ratio of first side transformer windings $N_{Prim,45}$ and second side transformer windings $N_{Sec,45}$ of the transformer 45, i.e. as the ratio $N_{Prim,45}/N_{Sec,45}$. Consequently, the voltage across the second side terminals, namely $V_{DC,Sec}$, is controlled to be $V_{DC,Prim}*(1/N_{T,41}+1/N_{T,45})$.

In the exemplary embodiment of FIG. 4, both $N_{T,41}$ and $N_{T,45}$ are 2/1. Therefore, above formula yields that the voltage across the second side terminals 12, $V_{DC,Sec}$, is controlled to equal the voltage across the first side terminals 10, $V_{DC,Prim}$. Accordingly, the depicted embodiment allows for a galvanic isolation between the first side terminals 10 and the second side terminals 12 without a change in voltage therebetween.

Depending on the particular application for the DC/AC converter, a voltage ratio other than 1 between the first side terminals 10 and the second side terminals 12 may be desirable. The ratios of the respective transformer windings as well as an arrangement of further second side converter circuits provide for a large number of degrees of freedom that a designer may use to adapt the DC/AC converter to the particular usage scenario. In a case where all transformer circuits have transformers with the same transformer ratios, denoted $N_T$, the voltage across the second side terminals 12 equals the voltage across the first side terminals 10 divided by the transformer ratio $N_T$ and multiplied by the number of second side converter circuits of the particular implementation.

Figure 6:
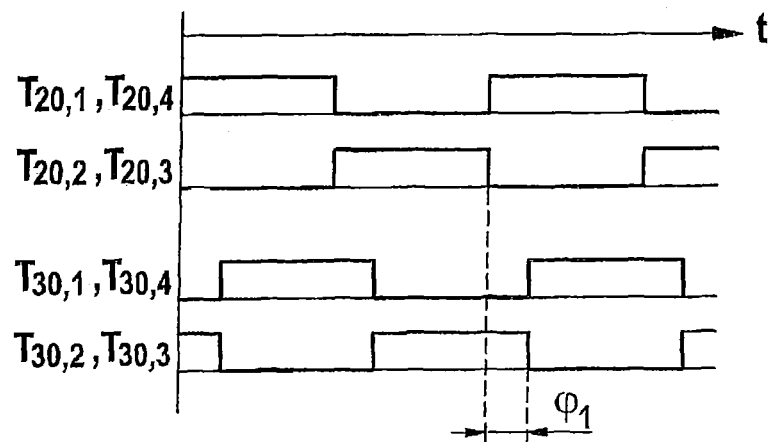
FIG. 6 shows a timing diagram of the control signals applied to the DC/DC conversion stage according to an exemplary embodiment of the invention.

The control of the DC/DC conversion stage 4 is described with respect to a subsystem thereof comprising the first side converter circuit 20, the transformer circuit 40, and the second side converter circuit 30. For exemplary purposes, a power transfer from the first side converter circuit 20 through the transformer circuit 40 to the second side converter circuit 30 is described. As explained above, due to the symmetry of the DC/DC conversion stage 4, a power transfer from the second side converter circuit 30 through the transformer circuit 40 to the first side converter circuit 20 can be effected in an analogous manner. Reference is also made to FIG. 6, wherein a timing diagram of the control signals to the transistors of the first side converter circuit 20 and the second side converter circuit 30 is depicted. A "high" state of these control signals indicates that the switch of the respective transistor is closed, whereas a "low" state indicates that the switch of the respective transistor is open.

As can be seen in FIG. 6, the transistors of the first side converter circuit 20 are controlled in such a way that the diagonals of the H bridge are put into a conductive state in an alternating manner Both of the diagonals are controlled to be conductive during 50% of the time. In other words, two complementary PWM signals are supplied to the two diagonals of the H bridge, with the PWM signals having a duty cycle of 50%. The control alternates between putting the transistors $T_{20.1}$ and $T_{20.4}$ on the one hand and the transistors $T_{20.2}$ and $T_{20.3}$ on the other hand into a conductive state.

The diagonals of the second side converter circuits 30 are also controlled by two complementary PWM signals having a duty cycle of 50%, as shown in FIG. 6. In the setup of FIG. 4, the phase shift between the complementary PWM signals controlling the first side converter circuit 20 and the complementary PWM signals controlling the second side converter circuit 30, denoted as $\phi_1$ controls the direction and amount of power transfer between the first side converter circuit 20 and the second side converter circuit 30.

For example, when the DC/AC converter 2 is operated to supply AC power to an AC load coupled to the AC terminals 80, 82 and 84, a power transfer from the first side converter circuit 20 through the transformer circuit 40 to the second side converter circuit 30 takes place. In this case, if the second side capacitor 60 of the second side converter circuit 30 deviates from its desired value, namely the voltage across the first side capacitor 50 divided by the transformer ratio of the transformer 40, the phase shift $\phi_1$, is adjusted, such that the adjusted power transfer ensures a return of the voltage across the second side capacitor 60 to the desired value. In other words, a control algorithm is established, wherein the deviation of the voltage across the second side capacitor 60 from the desired value represents the control error and the phase shift $\phi_1$, represents the correcting variable.

Figure 7:
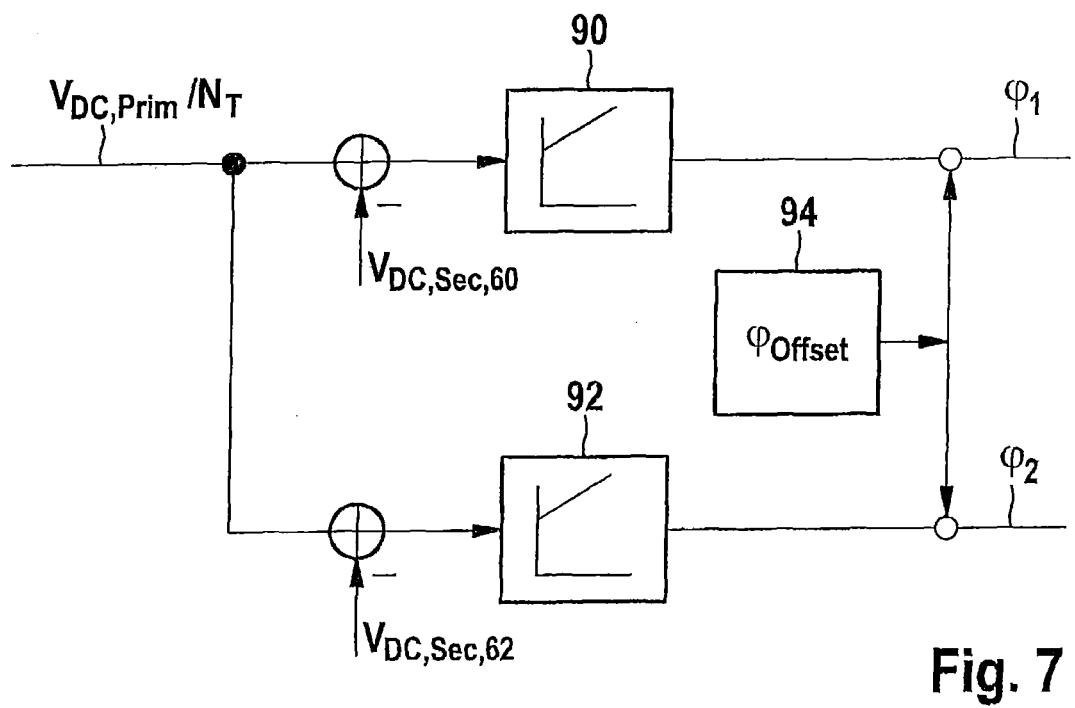
FIG. 7 shows a block diagram illustrating the control of the DC/DC conversion stage according to an exemplary embodiment of the invention.

FIG. 7 shows a block diagram of the control of both subsystems of the DC/DC conversion stage 4 of FIG. 4. The correcting variable $\phi_1$, is used for controlling the first subsystem consisting of the first side converter circuit 20, the transformer circuit 40 and the second side converter circuit 30. The correcting variable $\phi_2$ is used for controlling the second subsystem consisting of the first side converter circuit 22, the transformer circuit 44 and the second side converter circuit 32. As the transformer ratios of the transformer 41 and the transformer 45 are the same in the exemplary embodiment of FIG. 4, namely $N_T$, the desired voltages across the second side capacitors 60 and 62 are the same, namely $V_{DC,Prim}/N_T$. The actual voltages across the second side capacitors 60, 62, denoted $V_{DC,Sec,60}$ and $V_{DC,Sec,62}$, are respectively subtracted from the desired voltages across these capacitors, such that a respective control error is determined. The respective control errors are fed into respective control blocks 90, 92, wherein the respective phase shifts for the first and second subsystems are calculated on the basis of current and previous control errors. In the exemplary embodiment of FIG. 7, PI control algorithms (proportional integral control algorithms) are implemented in the control blocks 90 and 92. As is apparent to a person skilled in the art, however, other control algorithms may be suitable depending on the particular application and desired behaviour of the DC/AC converter.

FIG. 7 shows the additional block 94, which generates an offset value $\phi_{Offset}$. The actual control signals for the first and second subsystems, namely $\phi_1$ and $\phi_2$, are determined on the basis of the outputs of control blocks 90, 92 and the value of $\phi_{Offset}$. In this way, an additional degree of freedom for conditioning the power transfer between the first side terminals 10 and the second terminals 12 is given. It is pointed out that block 94 is an optional feature of the control depicted in FIG. 7.

In the exemplary embodiment of FIG. 4, the voltages across the two second side capacitors 60 and 62 are controlled to be the same. Accordingly, the connection point 34 between the two second side converter circuits 30 and 32 has, in operation, a potential in the middle of the two potentials present at the pair of second side terminals 12. In other words, the potential of the connection point 34 is the average of the potentials at the second side terminals 12. In yet other words, the connection point 34 is controlled to be a point of neutral potential with regard to the pair of second side terminals 12. As such a point of neutral potential, the connection point 34 forms a reference point for the AC voltage system. The neutral terminal 86 is connected directly to the connection point 34, such that the reference point of the AC voltage system is obtained without the provision of a further half bridge converter between the pair of second side terminals 12. With the connection point 34 coupled to the neutral terminal 86, the AC voltages at AC terminals 80, 82 and 84 can alternate freely between the two voltage levels present at the pair of second side terminals 12, while the connection between the neutral terminal 86 and the connection point 34 ensures that the reference voltage of the AC voltage system equals the midpoint between the two voltage levels present at the pair of second side terminals 12. In an alternative embodiment, a periodic asymmetry of voltages at the pair of second side terminals 12 with regard to the voltage at the connection point 34 may be effected by the control. In this way, a higher AC voltage level may be achieved at the AC terminals 80, 82 and 84. It is also possible to achieve a given AC voltage level with a lower duty cycle at the half bridge converters 70, 72 and 74 in this way.

Figure 5:
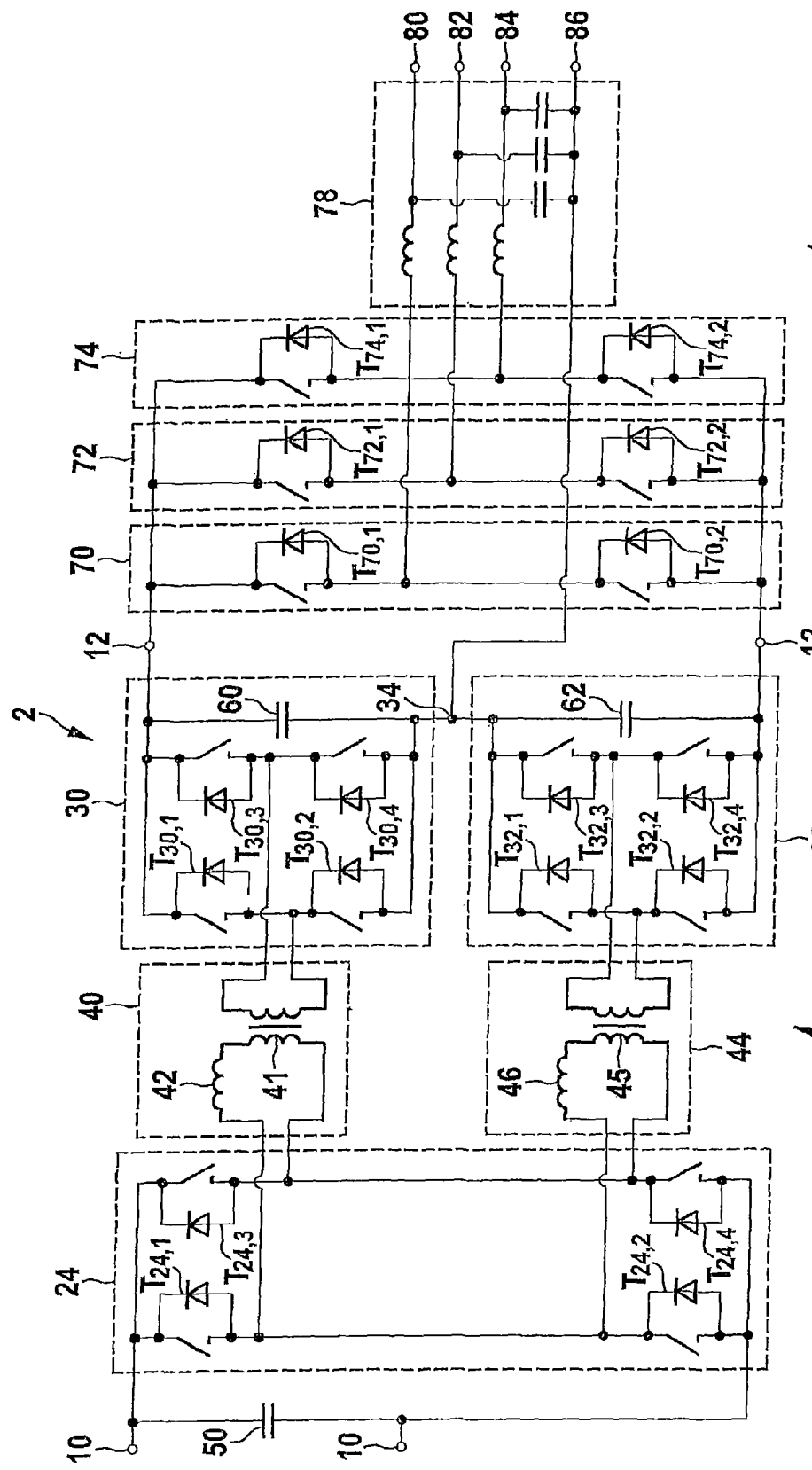
FIG. 5 shows a circuit diagram of a DC/AC converter according to another exemplary embodiment of the invention.

Reference is now made to FIG. 5, which shows a DC/AC converter 2 having a slightly different circuit structure than the DC/AC converter 2 of FIG. 4. In particular, the DC/DC conversion stage 4 of the DC/AC converter 2 of FIG. 5 only comprises one first side converter circuit 24 instead of the two first side converter circuits 20, 22 of FIG. 4. The first side converter circuit 24 comprises an H bridge circuit, which in turn comprises the four MOSFETs $T_{24,1}$ to $T_{24,4}$, depicted as a parallel connection of a switch and a diode, respectively. The two transformer circuits 40, 44 are coupled to the H bridge of the first side converter circuit 24 in parallel, i.e. their terminals are coupled to the same connection points within the first side converter circuit 24. Accordingly, all power transferred between the pair of first side terminals 10 and the pair of second side terminals 12 flows through the first side converter circuit 24, with that power being split up between the transformer circuit 40 and the second side converter circuit 30 on the one hand and the transformer circuit 44 and the second side converter circuit 32 on the other hand. Accordingly, the DC/DC conversion stage of the DC/AC converter 2 can be realized with fewer components at the expense of the first side converter circuit 24 being required to allow greater current levels in order to reach the same power transfer capability. Still, the H bridge circuit of the two second side converter circuits 30, 32 can be controlled independently with respect to the first side converter circuit 24, such that individual power transfer amounts can be established in order to account for different power requirements at the two second side capacitors 60 and 62, for example caused by non-equally distributed load conditions at the three AC phases 80, 82 and 84.

The DC/AC converter 2 of FIG. 5 may further be modified in that only one transformer circuit is present. This one transformer circuit has a transformer comprising one set of windings coupled to the first side converter circuit 24 and two sets of windings, each of which is coupled to one of the two second side converter circuits 30, 32.

Figure 8:
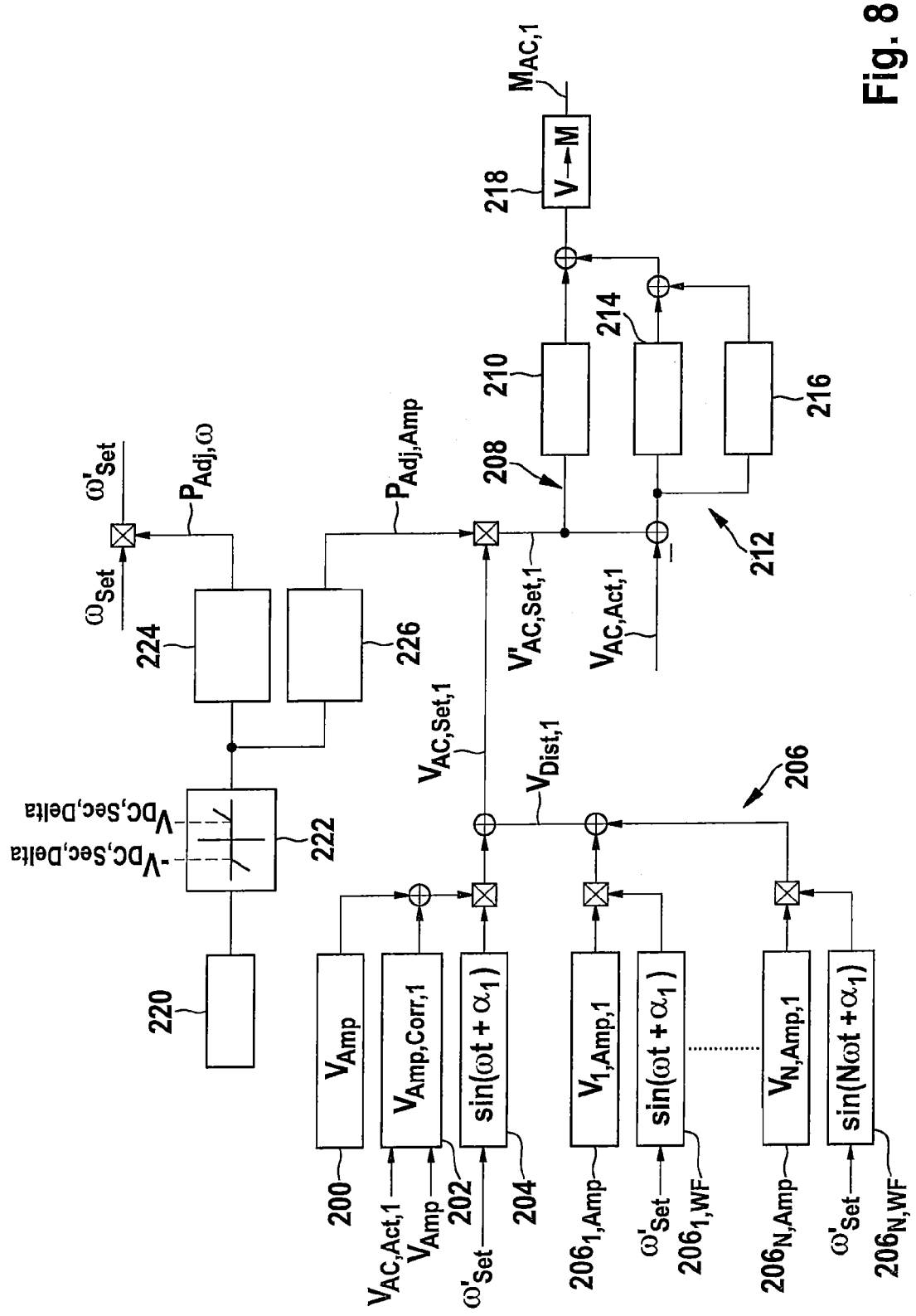
FIG. 8 shows a block diagram illustrating the control of the DC/AC conversion stage according to an exemplary embodiment of the invention.

The control of the DC/AC conversion stage 6 of the DC/AC converter 2 (of both FIG. 4 and FIG. 5) is now described with reference to FIG. 8. In particular, FIG. 8 describes the control of the DC/AC conversion stage 6 for a load being coupled to the AC side of the DC/AC converter 2, i.e. for the power transfer direction being from the DC side to the AC side. FIG. 8 is a block diagram illustrating how the control signal for one of the half bridge converters 70, 72 and 74 of the DC/AC conversion stage 6 is obtained. In particular, FIG. 8 shows how the PWM signal $M_{AC,1}$ is obtained, which controls the half bridge converter 70 and through the control of which the AC voltage between the terminals 80 and 86 is controlled. As this AC voltage phase is also referred to as the first AC voltage, all variables given in FIG. 8 that may be different among the three AC voltage phases are denoted with the index 1.

The method starts with providing a desired voltage amplitude value of the AC voltage between terminals 80 and 86, denoted $V_{Amp}$. In more general terms, this value is referred to as the desired AC side reference value. In the block diagram of FIG. 8, function block 200 sets and outputs $V_{Amp}$.

Further, a reference correction value, denoted $V_{Amp,Corr,1}$ is calculated. The calculation thereof is carried out by function block 202, with the details thereof being explained below. The reference correction value $V_{Amp,Corr,1}$ is added to the desired voltage value $V_{Amp}$.

The sum of the desired voltage value $V_{Amp}$ and the reference correction value $V_{Amp,Corr,1}$ is then multiplied with the waveform desired to be present at the AC terminal 80. In the exemplary embodiment of FIG. 8, this wave form is a sinusoidal wave having the angular frequency ω and the phase shift $\alpha_1$. It is provided by function block 204. The result of this multiplication can therefore be written as $(V_{Amp}+V_{Amp,Corr,1})*\sin(\omega t+\alpha_1)$.

The exemplary embodiment of FIG. 8 further comprises a distortion smoothing signal creator 206, generating a distortion smoothing signal $V_{Dist,1}$. The provision of the distortion smoothing signal $V_{Dist,1}$ is based on the idea that the switching actions in the half bridge converters 70, 72 and 74 give rise to distortions in the resulting AC voltages present at AC terminals 80, 82 and 84. By providing a distortion smoothing signal for the control of these half bridge circuits, effective countermeasures against the switching distortions are provided within the DC/AC converter control.

The distortion smoothing signal $V_{Dist,1}$ in turn comprises a plurality of signal components, with these signal components being harmonics of the sinusoidal signal representing the desired waveform of the AC signal, which is provided by function block 204. In connection with the exemplary embodiment of FIG. 8, the general case of N harmonic signal components is described. However, for a better intelligibility of FIG. 8, only the function blocks responsible for the generation of two signal components are actually depicted. Every distortion smoothing signal component is derived from the multiplication of its amplitude and its waveform. The function block $206_{1,Amp}$ provides the amplitude $V_{1,Amp,1}$ of a distortion smoothing signal component having the same frequency as the frequency of the desired AC frequency, namely ω, while the function block $206_{1,WF}$ provides the sinusoidal waves form having the frequency ω. The function block $206_{N,Amp}$ provides the amplitude $V_{N,Amp,1}$ of an N-th harmonic distortion smoothing signal component having N times the frequency of the desired AC waveform, namely Nω, while the function block $206_{N,WF}$ provides the sinusoidal waveform having the frequency Nω. The dots depicted between the function blocks $206_{1,WF}$ and $206_{N,Amp}$ indicate that other harmonic signal components may also be present in the exemplary embodiment of FIG. 8. All of the harmonic signal components have the same phase angle $\alpha_1$, as the desired AC voltage waveform, such that they represent in-phase harmonics thereof.

The harmonic distortion smoothing signal components are added to yield the distortion smoothing signal $V_{Dist,1}$. The distortion smoothing signal $V_{Dist,1}$ is then added to the term $(V_{Amp}+V_{Amp,Corr,1})*\sin(\omega+\alpha_1)$ in order to yield a reference signal for the AC voltage present at AC terminal 80, denoted $V_{AC,Set,1}$, which is also referred to as AC side reference signal in more general terms.

In other embodiments, only a particular subset of harmonics may be present in the distortion smoothing signal $V_{Dist,1}$, depending on the artifacts introduced by the half bridge converters. In particular, in an exemplary embodiment of the invention, there may be only the third or fifth or seventh harmonic signal component present in the distortion smoothing signal $V_{Dist,1}$. It is also possible that the distortion smoothing signal creator 206 is entirely dispensed with.

The AC side reference signal $V_{AC,Set,1}$ is then adjusted via a multiplication with a reference signal adjustment value $P_{Adj,Amp}$ before being fed to a feed-forward control path 208 and a feedback control path 212. The result of the multiplication is denoted $V'_{AC,Set,1}$. The nature and calculation of the reference signal adjustment value $P_{Adj,Amp}$ will be explained later. It is pointed out, however, that the multiplication with this reference signal adjustment factor is an optional feature of the exemplary embodiment of FIG. 8. When eliminating this multiplication, $V'_{AC,Set,1}$ equals $V_{AC,Set,1}$.

In the feed-forward control path 208, the AC side reference signal $V'_{AC,Set,1}$ is scaled by the voltage across the second side terminals 12, namely $V_{DC,Sec}$. In particular, the AC side reference signal $V'_{AC,Set,1}$ may be multiplied with the factor $A/V_{DC,Sec}$, wherein A is a multiplication constant. This multiplication is carried out by function block 210. In this way, it is ensured that the function block 218, which will be described below, takes into account the momentary voltage conditions at the second side terminals 12 and controls the half bridge converters accordingly. Alternatively, an appropriate scaling may be performed in the function block 218 itself, such that the function block 210 in the feed forward control path 208 can be dispensed with.

In the feedback control path 212, a difference between the AC side reference signal $V'_{AC,Set,1}$ and an actual AC voltage at the AC terminal 80, denoted $V_{AC,Act,1}$ also referred to as an actual AC side signal, is calculated. This difference represents a control error of the method of controlling the DC/AC converter 2. The control error is fed to two control elements, namely a proportional gain element 214 and a generalized integration element 216. A generalized integration element is an integration control element that is adapted to properly take into account control errors of sinusoidal signals, preventing a cancelling out of control errors for subsequent half waves of the sinusoidal signal. The output signals of the two control elements 214 and 216 are then added and jointly form a feedback control signal.

The feed-forward control signal and the feedback control signal are then combined by addition. The combined control signal represents a modulation level and is translated into a control signal for the half bridge converter 70 by a function block 218. The control signal for the half bridge converter is denoted $M_{AC,1}$. It results in a particular sequence of open/closed states of the switches in the half bridge converter 70 and may therefore be seen as a PWM signal.

Now, reference is made again to the function block 202 and the generation of the reference correction value $V_{Amp,Corr,1}$. The goal pursued by the provision of the reference correction value $V_{Amp,Corr,1}$ is to help the control method for the DC/AC converter 2 in such a way that the desired AC side behaviour may be slightly modified in order for the control method to reach an AC side behavior close to the unmodified desired AC side behavior more easily, thereby improving the response time of the control method, while accepting a slight deviation from the desired AC side behaviour within tolerable limits. The provision of the reference correction value $V_{Amp,Corr,1}$ can therefore be seen as a higher level controller for the lower level controller consisting of feed-forward control path 208 and feedback control path 212, such that a two level control is formed.

For the purpose of providing the reference correction value $V_{Amp,Corr,1}$, the actual AC side signal $V_{AC,Act,1}$ is compared to the desired voltage value $V_{Amp}$ in intervals. In the exemplary embodiment of FIG. 8, this comparison takes place twice per signal period of the actual AC side signal $V_{AC,Act,1}$, namely at the positive and negative maximum points thereof. In other words, the amplitude of the actual AC side signal $V_{AC,Act,1}$ is compared to the desired voltage value $V_{Amp}$. From this comparison, the value $V_{Amp,Corr,1}$ is obtained in such a way that the AC side reference signal $V'_{AC,Set,1}$ is adjusted to reduce a deviation between the amplitude of the actual AC side signal $V_{AC,Act,1}$ and the desired amplitude voltage value $V_{Amp}$ at the AC terminal 80. In other words, $V_{Amp,Corr,1}$ is calculated in such a way that the control error fed to the feedback control path 212 is adjusted. In the exemplary embodiment of FIG. 8, the reference correction value $V_{Amp,Corr,1}$ is set in such a way that the control error fed to the feedback control path 212 is increased. The lower level controller in the feedback control path 212 therefore faces a more removed control target and takes more drastic control measures. In this way, the controlling of the DC/AC conversion stage 6 is adapted in such a way that the deviation between the actual AC side signal $V_{AC,Act,1}$ and the desired amplitude voltage value $V_{Amp}$ can be decreased more easily and faster than without the provision of the reference correction value $V_{Amp,Corr,1}$. Therefore, an efficient control can be achieved over a wider range of operating conditions. In particular, dynamic operating conditions can be dealt with in an improved way.

The calculation of the reference correction value $V_{Amp,Corr,1}$ is explained in more detail. The control method starts with the reference correction value being set to zero. During operation, it is determined if the amplitude of the actual AC side signal $V_{AC,Act,1}$ differs from the desired amplitude voltage value $V_{Amp}$ more than a preset correction threshold $V_{AC,Delta}$. In mathematical terms, it is determined if |Amplitude $(V_{AC,Act,1})$–$V_{Amp}$|>$V_{AC,Delta}$. If this is the case, $V_{Amp,Corr,1}$ is incremented or decremented, depending on which one of the amplitudes of the actual AC side signal $V_{AC,Act,1}$ and the desired amplitude voltage value $V_{Amp}$ is greater. In particular, the reference correction value $V_{Amp,Corr,1}$ is incremented or decremented by a preset increment value, which is also $V_{AC,Delta}$ in the exemplary embodiment of FIG. 8. However, it is possible that the preset increment value is different from the preset correction threshold $V_{AC,Delta}$. By providing the reference correction value $V_{Amp,Corr,1}$ in this way, the overall control accuracy is traded off against a proper functioning over a wider range of operational scenarios. In particular, the described higher level control for the lower level control allows the DC/AC converter 2 to find a stable operating point close to the desired AC side behavior that potentially could not have been found without allowing a certain deviation from the desired AC side reference value.

It is pointed out that the control error to be fed to the feedback control path 212 is continuously calculated over the whole period of the AC side reference signal $V'_{AC,Set,1}$ and the actual AC side signal $V_{VAC,Act,1}$, whereas the reference correction value $V_{Amp,Corr,1}$ is adjusted at most twice per period in the exemplary embodiment of FIG. 8. Accordingly, the controller comprising the feedback control path 212 has the chance to correct the control error before the control for the control, implemented via the reference correction value $V_{Amp,Corr,1}$, starts overruling. Therefore, it is ensured that an attempt at reaching the desired AC side behaviour is made before the control for the control allows a loosening of the control goal. This may also be reached by calculating the reference correction value $V_{Amp,Corr,1}$ only after a preset delay time after a start-up or a change of the operating conditions of the DC/AC converter 2. Also, the reference correction value $V_{Amp,Corr,1}$ may then be adjusted again only after the preset delay time Reference is now made to a high level means of influencing the control of the DC/AC conversion stage 6 based on the momentary behavior of the DC/DC conversion stage 4. At the function block 220, a performance metric indicative of a deviation of the DC/DC conversion stage 4 from a desired operating point is calculated. In the exemplary embodiment of FIG. 8, the DC/DC conversion stage performance metric is defined by a ratio of the actual voltage across the pair of second side terminals 12 of the DC/DC conversion stage 4, namely $V_{DC,Sec}$, and a desired voltage across the pair of second side terminals 12 of the DC/DC conversion stage 4. The desired voltage is $V_{DC,Prim}/N$, with N being the transformer ratio $N_T$ of the transformers of the transformer circuits of the DC/DC conversion stage 4 divided by the number of second side converter circuits $N_{Sub}$, assuming that all transformers have the same transformer ratio $N_T$. The stated expression of the desired voltage across the pair of second side terminals 12 is based on above described control scheme of controlling the voltage across the second side capacitors to be the voltage across the first side capacitor divided by the transformer ratio. Accordingly, the formula for the performance metric is $(V_{DC,Sec}*N_T)/(V_{DC,Prim}*N_{Sub})$ in the exemplary embodiment of FIG. 8. However, it is pointed out that other performance metrics may also be used. For example, a difference between the actual voltage across the pair of second side terminals 12 and the desired voltage across the pair of second side terminals 12 may be involved in generating such a performance metric.

When the DC/DC conversion stage 4 operates at the desired operating point, the quotient of $(V_{DC,Sec}*N_T)/(V_{DC,Prim}*N_{Sub})$ equals 1. When the DC/DC conversion stage 4 deviates from the desired operating point, the performance metric deviates from the value of 1. As graphically indicated in connection with function block 222, it is then determined if the calculated performance metric deviates more than $V_{DC,Sec,Delta}$ or $-V_{DC,Sec,Delta}$ from the value of 1. In more general terms, it is determined if the performance metric deviates in absolute terms more than a preset deviation threshold from its value at the desired operating point. The function block 222 then calculates an output based on the deviation. In case the deviation is below the preset deviation threshold, the function block 222 outputs the value 1. In case the absolute amount of the deviation is greater or equal to the preset deviation threshold, the function block outputs a value different than 1. The function determining the output of function block 222 may be a linear function mapping the deviation to the output. Also, another type of function may be used.

The output is then fed to a frequency adjusting function block 224 and an amplitude adjusting function block 226. Function blocks 224 and 226 carry out functions mapping the output of function block 222 to an AC frequency adjustment value $P_{Adj,\omega}$ and the reference signal adjustment value $P_{Adj,Amp}$, respectively. With the functions of function blocks 224 and 226, it can be influenced, which one of the frequency of the AC voltage system or the amplitude of the AC voltage system is to be adjusted when the DC/DC conversion stage 4 does not operate as desired. For example, when the load on the AC side is too large for the power transfer capacities of the DC/DC conversion stage 4 and, as a consequence, the voltage across second side terminals 12, namely $V_{DC,Sec}$, drops, the countermeasures of reducing the AC voltage amplitude or reducing the AC voltage frequency can be balanced. In AC voltage systems where the DC/AC converter 2 is the only power source for the AC voltage system, the functions of function blocks 224 and 226 may be designed to give preference to a change in amplitude, i.e. to adjust $P_{Adj,Amp}$ primarily. In AC voltage systems where the DC/AC converter 2 is one of a plurality of power sources for the AC voltage system, the functions of function blocks 224 and 226 may be designed to give preference to a change in frequency, i.e. to adjust $P_{Adj,\omega}$ primarily.

As explained above, the reference signal adjustment value $P_{Adj,Amp}$ is multiplied with the AC side reference signal $V_{AC,Set,1}$ in order to yield a modified AC side reference signal $V'_{AC,Set,1}$. The function block 226 ensures that $P_{Adj,Amp}$ equals 1 when the DC/DC conversion stage 4 operates as desired. The AC frequency adjustment value $P_{Adj,\omega}$ is multiplied with the desired frequency $\omega_{Set}$ of the AC voltage system to yield a modified desired frequency $\omega'_{Set}$. The modified desired frequency w'set then serves as the basis for the waveform generating blocks 204, $206_{1,WF}$, ..., $206_{N,WF}$. The blocks 204, $206_{1,WF}$, ..., $206_{N,WF}$ will set the frequencies $\omega$, ..., N$\omega$ to the modified desired frequency and its multiples, namely to $\omega'_{Set}$, ..., N$\omega'_{Set}$. The function block 224 ensures that $P_{Adj,\omega}$ equals 1 when the DC/DC conversion stage 4 operates as desired.

In this way, the DC/DC conversion stage 4 is helped to recuperate its desired operating point by the control of the DC/AC conversion stage 6.

Typical applications for the DC/AC converter 2 are isolated networks, where a DC power source, such as a combustion engine coupled to an electric generator providing DC power, is connected to the DC side and a load network is connected to the AC side.

The voltage across the pair of second side terminals 12 of the DC/DC conversion stage 4 may be between 300 V and 800 V. The AC voltage may be between 100 V and 240 V. However, the DC/AC converter 2 may also be sized for other applications.

It is pointed out that the circuit topology of the DC/AC converter, as described with respect to FIGS. 4 and 5, may be implemented independently from the method of controlling the DC/AC converter, as described with respect to FIG. 8. In other words, the DC/AC conversion stage of the DC/AC converter of FIGS. 4 and 5 may be controlled by other methods than the one described with respect to FIG. 8. Also, the method of controlling the DC/AC conversion stage, as described with respect to FIG. 8, may be carried out in the context of other DC/AC converters as well, in particular in the context of DC/AC converters with different DC/DC conversion stage or with no DC/DC conversion stages at all.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A DC/AC converter comprising a DC/DC conversion stage with galvanic isolation and a DC/AC conversion stage, wherein the DC/DC conversion stage comprises:
   a pair of first side terminals providing or receiving a first DC voltage, a pair of second side terminals providing or receiving a second DC voltage and coupled to the DC/AC conversion stage,
   at least one first side converter circuit coupled between the pair of first side terminals,
   a series connection of a plurality of second side converter circuits coupled between the pair of second side terminals, and
   at least one transformer circuit coupling the plurality of second side converter circuits to the at least one first side converter circuit,
   wherein a connection point within the series connection between two of the plurality of second side converter circuits is coupled to the DC/AC conversion stage and forms a neutral phase point thereof.

2. The DC/AC converter according to claim 1, wherein the series connection of the plurality of second side converter circuits consists of an even number of second side converter circuits and wherein said connection point is a center point of the series connection of the plurality of second side converter circuits.

3. The DC/AC converter according to claim 1, wherein the DC/DC conversion stage has symmetric power transfer characteristics between the pair of first side terminals and the pair of second side terminals.

4. The DC/AC converter according to claim 1, wherein the number of transformer circuits is equal to the number of second side converter circuits, with each one of the plurality of second side converter circuits being associated with one of the at least one first side converter circuit via coupling through a respective transformer circuit.

5. The DC/AC converter according to claim 1, wherein each of the at least one transformer circuit is configured to have a current source characteristic.

6. The DC/AC converter according to claim 1, wherein each of the at least one transformer circuit comprises a transformer and an inductance element coupled in series with the transformer.

7. The DC/AC converter according to claim 1, wherein the at least one first side converter circuit has a voltage source characteristic.

8. The DC/AC converter according to claim 1, wherein a first side capacitance element is coupled between the pair of first side terminals.

9. The DC/AC converter according to claim 1, wherein each of the at least one first side converter circuits comprises an H bridge circuit.

10. The DC/AC converter according to claim 1, wherein each of the plurality of second side converter circuits has a voltage source characteristic.

11. The DC/AC converter according to claim 1, wherein each of the plurality of second side converter circuits comprises a second side capacitance element, with the second side capacitance elements being connected in series between the pair of second side terminals.

12. The DC/AC converter according to claim 1, wherein each of the plurality of second side converter circuits comprises an H bridge circuit.

13. The DC/AC converter according to claim 1, wherein the even number of second side converter circuits is one of 2, 4, 6 and 8.

14. The DC/AC converter according to claim 1, wherein the at least one first side converter circuit is a plurality of first side converter circuits, with the plurality of first side converter circuits being connected in parallel between the first side terminals.

15. The DC/AC converter according to claim 1, wherein the number of first side converter circuits is equal to the number of second side converter circuits.

16. The DC/AC converter according to claim 1, wherein the number of second side converter circuits is equal to the number of first side converter circuits multiplied by N, with N being a natural number of at least 2.

17. The DC/AC converter according to claim 16, wherein N second side converter circuits, N transformer circuits and one first side converter circuits form a respective power transfer set.

18. The DC/AC converter according to claim 17, wherein the N transformer circuits of a respective power transfer set are connected in parallel.

19. The DC/AC converter according to claim 1, wherein each of the at least one first side converter circuits is controlled by a respective first side control signal and each of the plurality of the second side converter circuits is controlled by a respective second side control signal.

20. The DC/AC converter according to claim 19, wherein the first side control signals and the second side control signals are signals for controlling respective H bridges.

21. The DC/AC converter according to claim 19, wherein the first side control signals and second side control signals are controlled for being pulse signals having the same periods and duty cycles, with a phase relationship between the first side control signals and the second side control signals being controlled for controlling a power transfer between the pair of first side terminals and the pair of second side terminals.

22. The DC/AC converter according to claim 19, wherein the first side control signals and the second side control signals are pulse signals having a duty cycle of substantially 50%.

23. The DC/AC converter according to claim 19, wherein each second side converter circuit is controlled with respect to its associated first side converter circuit, with a phase shift between the second side control signal of the respective second side converter circuit and the first side control signal of its associated first side converter circuit controlling a power transfer.

24. The DC/AC converter according to claim 1, wherein a ratio of a second side voltage of each of the second side converter circuits and a voltage across the pair of first side terminals is controlled to be a transformer ratio of the respective one of the at least one transformer circuit coupling the respective second side converter circuit to the at least one first side converter circuit.

25. The DC/AC converter according to claim 1, wherein each of the plurality of second side converter circuits is controlled separately.

* * * * *